(12) United States Patent
Ortiz

(10) Patent No.: US 6,916,992 B1
(45) Date of Patent: Jul. 12, 2005

(54) CORD ORGANIZING SHEATH ASSEMBLY

(76) Inventor: Jesenia Ortiz, 1535 Undercliff Ave., 108, Bronx, NY (US) 10453

( * ) Notice: Subject to any disclaimer, the term of this patent is extended or adjusted under 35 U.S.C. 154(b) by 0 days.

(21) Appl. No.: 10/741,546

(22) Filed: Dec. 19, 2003

(51) Int. Cl.[7] .............................................. H02G 15/00
(52) U.S. Cl. .............................. 174/138 F; 174/138 G; 174/68.3; 174/135; 174/72 A; 174/137 R; 24/16 R
(58) Field of Search ......................... 174/138 F, 138 G, 174/68.3, 135, 72 A, 137 R, 74 A, 70 C; 24/16 R; 248/49, 51, 52

(56) References Cited

U.S. PATENT DOCUMENTS

| | | |
|---|---|---|
| 2,137,536 A | 11/1938 | Mc Connell |
| 4,454,374 A | 6/1984 | Pollack |
| 4,629,826 A | 12/1986 | Thomas |
| 5,733,138 A * | 3/1998 | Kramer ....................... 439/369 |
| 6,789,671 B2 * | 9/2004 | Morrison et al. ........... 206/388 |

* cited by examiner

Primary Examiner—Dean A. Reichard
Assistant Examiner—Jinhee Lee

(57) ABSTRACT

A cord organizing sheath assembly for facilitating placement of multiple cords through a sheath to organize the cords and provide a desirable aesthetic effect. The cord organizing sheath assembly includes a sheath having a pair of open ends, a pouch for receiving and holding socket ends of cords, and a tether line attached to the sheath for pulling the pouch through the sheath such that the cords are threaded through the sheath.

9 Claims, 2 Drawing Sheets

US 6,916,992 B1

CORD ORGANIZING SHEATH ASSEMBLY

BACKGROUND OF THE INVENTION

1. Field of the Invention

The present invention relates to cord organizers and more particularly pertains to a new cord organizing sheath assembly for facilitating placement of multiple cords through a sheath to organize the cords and provide a desirable aesthetic effect.

2. Description of the Prior Art

The use of cord organizers is known in the prior art. U.S. Pat. No. 2,137,536 issued to McConnell describes a lamp socket and wire holding multiple piece bracket assembly. Another type of cord organizer is U.S. Pat. No. 4,454,374 issued to Pollack disclosing a base portion attachable to a surface and a generally C-shaped cover extending from the base portion to form a slot for receiving cords inserted between a distal end of the cover and the base portion. U.S. Pat. No. 4,629,826 issued to Thomas discloses another cord organizer having a base portion and generally C-shaped cover somewhat similar to the Pollack device but having a lengthwise groove for receiving the distal edge of the cover to close the cover over cords.

While these devices fulfill their respective, particular objectives and requirements, the need remains for a device that is flexible and that may be but is not specifically designed for attachment to a supporting surface.

SUMMARY OF THE INVENTION

The present invention generally comprises a sheath having a pair of open ends, a pouch for receiving and holding socket ends of cords, and a tether line attached to the sheath for pulling the pouch through the sheath such that the cords are threaded through the sheath.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
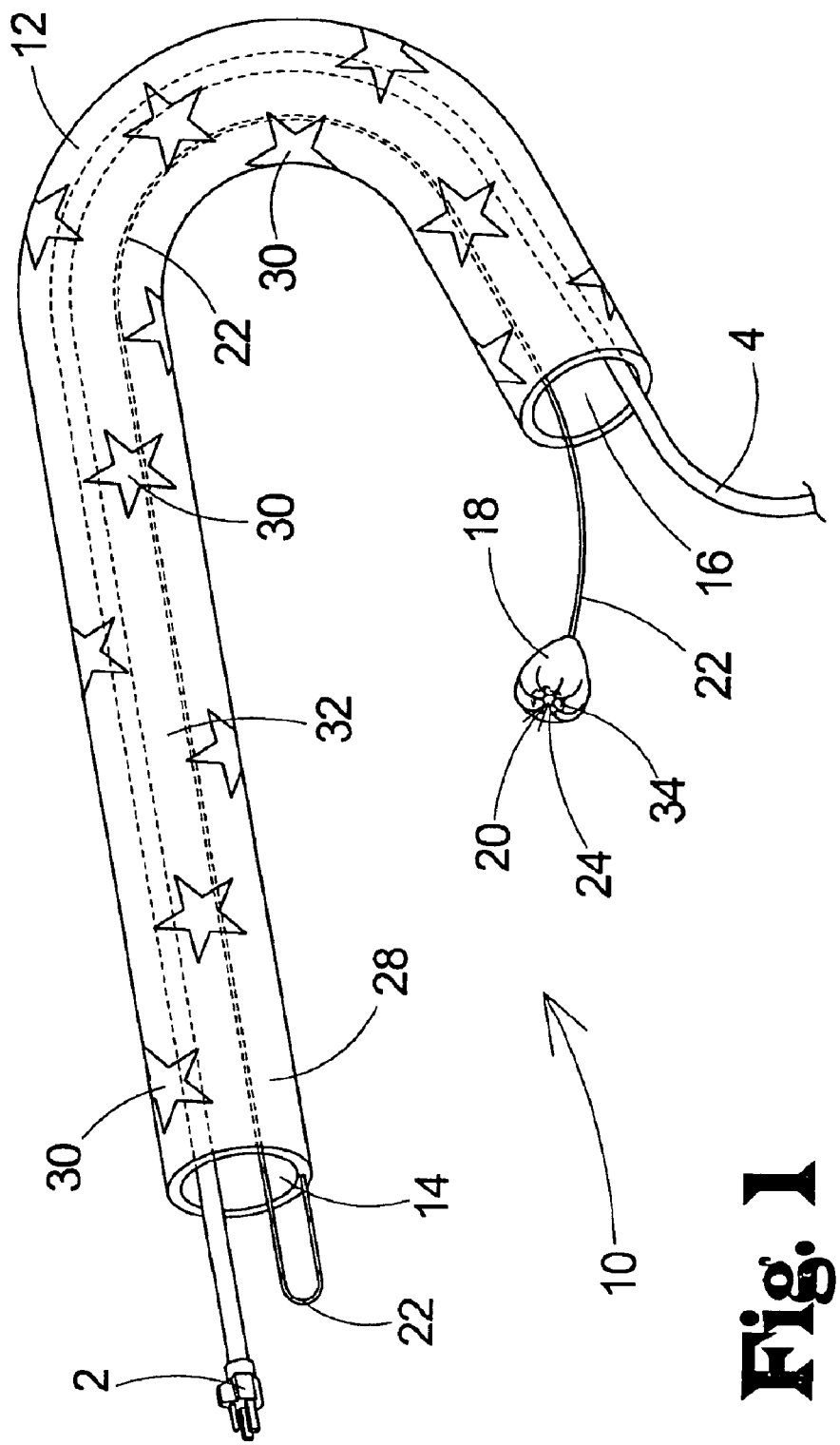
FIG. 1 is a perspective view of a new cord organizing sheath assembly according to the present invention.
Figure 2:
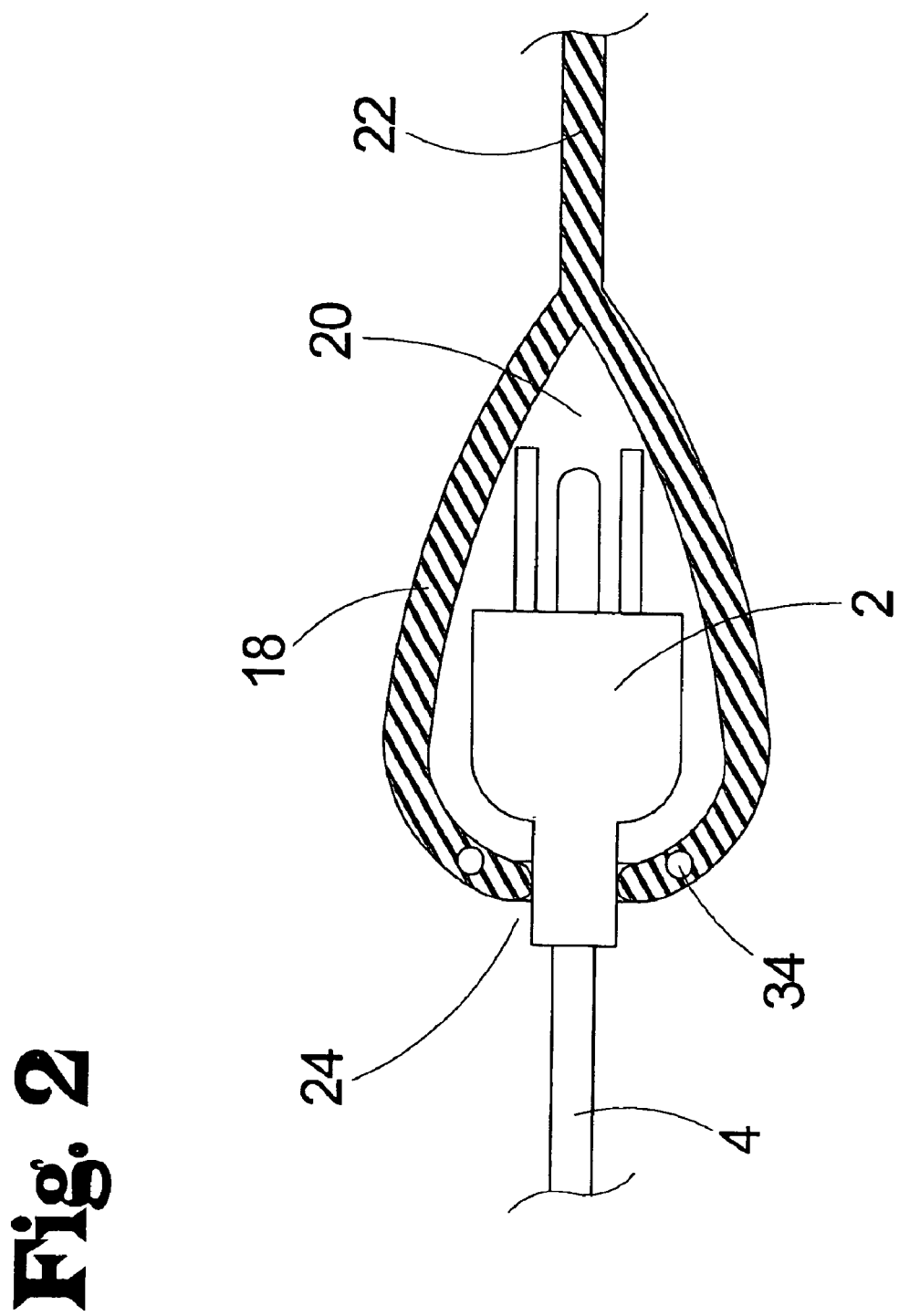
FIG. 2 is a cross-sectional view of the pouch of the present invention.

With reference now to the drawings, and in particular to FIGS. 1 and 2 thereof, a new cord organizing sheath assembly embodying the principles and concepts of the present invention and generally designated by the reference numeral 10 will be described.

As best illustrated in FIGS. 1 and 2, the cord organizing sheath assembly 10 generally comprises a sheath 12 that includes a pair of open ends 14, 16. A pouch 18 is provided includes an interior 20 designed for holding a socket end 2 of a cord 4. A tether line 22 couples the pouch to a first open end 14 of the sheath 12. The tether line 22 has a length greater than a length of the sheath 12. Thus, the pouch 18 is positionable outside the second open end 16 when the tether line 22 extends through the sheath 12.

The pouch 18 includes a resilient expandable opening 24 into the interior 20 of the pouch 18. Thus, the pouch 18 is designed for holding the socket end 2 of the cord 4 within the interior 20 to permit pulling the tether line 22 through the sheath 12 such that the cord 4 is drawn through the sheath 12. The resilient expandable opening 24 is preferably formed by an annular elastic band 34.

In the most preferred embodiment, the sheath 12 is constructed of a flexible flame-resistant material 28 such as a known plastic material designed for flame resistance and flexibility. Decorative indicia 30 may be positioned on an outer surface 32 of the sheath 12. The decorative indicia may be utilized for either drawing attention to the sheath 12 or effectively camouflaging the sheath 12 such that it blends into the surrounding area and is not readily seen, thus preserving the decorative appearance of the surrounding area.

In use, the sheath may provide decoration or camouflage for a single cord or organize a plurality of cords into a single mass having a neat and tidy appearance. The pouch is positioned outside the second open end and the socket end of one or more cords is inserted into the pouch. The tether line is pulled through the sheath assembly whereby the cord or cords are drawn through the sheath by the pouch. The sheath may be sized to receive several cords and socket ends at one time or sized with a smaller interior diameter to accommodate several cords but only a smaller number of socket ends at one time. It is possible to thread the multiple cords through the sheath by passing at least two cords through the sheath using the pouch, then releasing the pouch from all but one cord, pulling the pouch back through the sheath using the still attached socket end, and then inserting more socket ends into the pouch and repeating the process until either the maximum capacity of the sheath or the desired number of cords extend through the sheath.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cord organizing sheath assembly comprising:
  a sheath having a pair of open ends;
  a pouch having an interior, said interior holding a socket end of a cord; and
  a tether line coupling said pouch to a first one of said open ends of said sheath, said tether line having a length greater than a length of said sheath wherein said pouch is positionable outside a second one of said open ends when said tether line extends through said sheath.

2. The cord organizing sheath assembly of claim 1 wherein said pouch includes a resilient expandable opening into said interior of said pouch wherein said pouch is holding the socket end of the cord within said interior for permitting pulling of said tether line through said sheath such that the cord is drawn through said sheath.

3. The cord organizing sheath assembly of claim 1 wherein said sheath is constructed of a flexible material.

4. The cord organizing sheath assembly of claim 1 wherein said sheath is constructed of a flame-resistant material.

5. The cord organizing sheath assembly of claim 1, further comprising:

decorative indicia positioned on an outer surface of said sheath.

6. The cord organizing sheath assembly of claim 1 wherein said sheath is constructed of plastic.

7. The cord organizing sheath assembly of claim 2 wherein said resilient expandable opening is formed by an annular elastic band.

8. A cord organizing sheath assembly comprising:

a sheath having a pair of open ends;

a pouch having an interior, said interior holding a socket end of a cord;

a tether line coupling said pouch to a first one of said open ends of said sheath, said tether line having a length greater than a length of said sheath wherein said pouch is positionable outside a second one of said open ends when said tether line extends through said sheath;

wherein said pouch includes a resilient expandable opening into said interior of said pouch wherein said pouch is holding the socket end of the cord within said interior for permitting pulling of said tether line through said sheath such that the cord is drawn through said sheath;

wherein said sheath is constructed of a flexible flame-resistant material;

decorative indicia positioned on an outer surface of said sheath;

wherein said sheath is constructed of plastic; and wherein said resilient expandable opening is formed by an annular elastic band.

9. A method of organizing cords, the steps of the method comprising:

providing a plurality of cords;

providing a sheath having a pair of open ends, a pouch having an interior, said interior holding a socket end of each of said plurality of cords, and a tether line coupling said pouch to a first one of said open ends of said sheath, said tether line having a length greater than a length of said sheath, said tether line extending through said sheath and said pouch being positioned outside a second one of said-open ends;

inserting each of said socket ends of said cords into said pouch; and pulling said tether line through said sheath assembly wherein said plurality of cords are drawn through said sheath by said pouch.

* * * * *